(12) United States Patent
Janak et al.

(10) Patent No.: US 12,460,594 B2
(45) Date of Patent: Nov. 4, 2025

(54) SHUTDOWN CONTROL OF INTERNAL COMBUSTION ENGINE COMPRISING LOST MOTION COMPONENT

(71) Applicant: Jacobs Vehicle Systems, Inc., Bloomfield, CT (US)

(72) Inventors: Robb Janak, Bristol, CT (US); Justin D. Baltrucki, Canton, CT (US); Bruce A. Swanbon, Tolland, CT (US); Eric J. Hodgkinson, New Hartford, CT (US)

(73) Assignee: Jacobs Vehicle Systems, Inc., Bloomfield, CT (US)

( * ) Notice: Subject to any disclaimer, the term of this patent is extended or adjusted under 35 U.S.C. 154(b) by 0 days.

(21) Appl. No.: 18/524,380

(22) Filed: Nov. 30, 2023

(65) Prior Publication Data

US 2024/0175403 A1    May 30, 2024

Related U.S. Application Data

(60) Provisional application No. 63/385,447, filed on Nov. 30, 2022.

(51) Int. Cl.
 *F02D 41/04* (2006.01)
 *F01L 9/10* (2021.01)
 (Continued)

(52) U.S. Cl.
 CPC .............. *F02D 41/042* (2013.01); *F01L 9/10* (2021.01); *F01L 9/40* (2021.01); *F01L 13/0005* (2013.01);
 (Continued)

(58) Field of Classification Search
 CPC .......... F02D 41/042; F02D 13/06; F01L 9/10; F01L 13/0005; F01L 2009/4094; F01L 2013/001
 See application file for complete search history.

(56) References Cited

U.S. PATENT DOCUMENTS 7,765,052 B2   7/2010  Kaiser et al.
10,513,992 B1  12/2019 Gukelberger et al.
(Continued)

FOREIGN PATENT DOCUMENTS

CN   107387245 A   11/2017
CN   115013168 A   9/2022
(Continued)

OTHER PUBLICATIONS

Written Opinion of the International Searching Authority for International application No. PCT/IB2023/062092; mailed on Feb. 20, 2024; 4 pages.
(Continued)

*Primary Examiner* — Ngoc T Nguyen
(74) *Attorney, Agent, or Firm* — Jordan IP Law, LLC

(57) ABSTRACT

Control of engine shutdown of an internal combustion engine comprising a plurality of cylinders and, for each of the plurality of cylinders, a hydraulically controlled lost motion component operatively connected to an engine valve corresponding to the cylinder, is achieved when an engine controller determines that shutdown of the internal combustion engine has been requested. Responsive to the request for shutdown, the engine controller initiates or continues cylinder deactivation operation for each of at least one cylinder of the plurality of cylinders. The initiation or continuation of the cylinder deactivation operation for each of the at least one cylinder comprises, for an input to the hydraulically controlled lost motion component for each of at least one engine valve corresponding to the cylinder, operating the input to provide the cylinder deactivation operation for a duration at least long enough to complete shutdown of the internal combustion engine.

18 Claims, 9 Drawing Sheets

(51) Int. Cl.
*F01L 9/40* (2021.01)
*F01L 13/00* (2006.01)
*F02D 13/06* (2006.01)
*F02D 41/00* (2006.01)

(52) U.S. Cl.
CPC ......... *F02D 13/06* (2013.01); *F02D 41/0087* (2013.01); *F01L 2009/4094* (2021.01); *F01L 2013/001* (2013.01)

(56) References Cited

U.S. PATENT DOCUMENTS

| | | |
|---|---|---|
| 10,711,666 B1 | 7/2020 | Krach et al. |
| 2006/0037578 A1 | 2/2006 | Nakamura |
| 2009/0082170 A1 | 3/2009 | Heap |
| 2009/0118075 A1 | 5/2009 | Heap et al. |
| 2009/0118078 A1 | 5/2009 | Wilmanowicz et al. |
| 2009/0118942 A1 | 5/2009 | Hsieh et al. |
| 2011/0144888 A1 | 6/2011 | Rollinger et al. |
| 2012/0204827 A1 | 8/2012 | Sieber et al. |
| 2013/0255606 A1 | 10/2013 | Nishikiori et al. |
| 2015/0308301 A1 | 10/2015 | McConnville et al. |
| 2015/0377090 A1 | 12/2015 | Douglas |
| 2017/0002751 A1 | 1/2017 | Tatavrathi et al. |
| 2019/0048814 A1 | 2/2019 | Nakano |
| 2019/0178168 A1 | 6/2019 | McCarthy et al. |
| 2019/0249618 A1 | 8/2019 | Dudar |
| 2019/0263382 A1 | 8/2019 | Parsels et al. |
| 2019/0338710 A1 | 11/2019 | McCarthy et al. |
| 2019/0346012 A1 | 11/2019 | Gerty et al. |
| 2020/0011257 A1 | 1/2020 | Stretch et al. |
| 2020/0018197 A1 | 1/2020 | McCarthy et al. |
| 2020/0088073 A1 | 3/2020 | Baltrucki et al. |
| 2021/0189980 A1 | 6/2021 | Parsels et al. |
| 2022/0120230 A1 | 4/2022 | Wilcutts et al. |
| 2022/0154653 A1 | 5/2022 | McCarthy et al. |

FOREIGN PATENT DOCUMENTS

| | | |
|---|---|---|
| DE | 102013217250 A1 | 3/2014 |
| DE | 102013217404 A1 | 3/2014 |
| DE | 102018122543 A1 | 3/2020 |
| JP | S61159642 U | 10/1986 |
| JP | H05202714 A | 8/1993 |
| JP | 200034913 A | 2/2000 |
| WO | 2013081657 A1 | 6/2013 |
| WO | 2015153448 A1 | 10/2015 |
| WO | 2017117289 A1 | 7/2017 |
| WO | 2018204049 A1 | 11/2018 |
| WO | 202072828 A1 | 4/2020 |
| WO | 2022132807 A1 | 6/2022 |
| WO | 2022166616 A1 | 8/2022 |

OTHER PUBLICATIONS

International Search Report for International application No. PCT/IB2023/062092; mailed on Feb. 20, 2024; 3 pages.

SHUTDOWN CONTROL OF INTERNAL COMBUSTION ENGINE COMPRISING LOST MOTION COMPONENT

FIELD

The present disclosure generally concerns internal combustion engines having one or more lost motion components and, more specifically, the control of shutdown operation of such internal combustion engines using the one or more lost motion components.

BACKGROUND

In the field of large diesel engines, the issue of excessive vibrations at engine shutdown is well known. While multiple causes contribute to such vibrations, a significant factor is the large cylinder compression pressures generated by such engines. During engine shutdown, the presence of such pressures in unfueled cylinders can cause rotation of the engine's crankshaft to suddenly discontinue, thereby resulting in the return of significant residual energy to the engine block and causing significant shaking of the engine.

A well-known technique to minimize such vibrations is decompression of cylinders during engine shutdown. Decompression systems cause intake and/or exhaust valves to be maintained in an open state in unfueled cylinders during the engine shutdown process, thereby preventing the generation of high cylinder pressures during piston compression strokes. When the engine valves are maintained in this open state during a subsequent engine startup process, resistance to engine cranking is reduced, thereby reducing wear on an engine's starter motor. Further still, in engines without such decompression, the normal firing pattern of the engine's cylinders tend to cause it to cease crankshaft rotation in one of a few well-defined positions. In turn, this results in the starter motor pinion repeatedly engaging with the same portions of a starter ring gear at engine startup thereby causing excessive wear on the ring gear. On the other hand, decompression of cylinders during shutdown permits the starter ring gear to assume an essentially random final positioning relative to the starter motor during subsequent startups, thereby preventing excessive wear of the ring gear.

Cylinder deactivation (CDA) is a class of related technologies in which cylinders are prevented from generating power through cutting of fuel to a cylinder as well as deactivating intake and/or exhaust valves, i.e., preventing valve actuations from being applied to the intake and/or exhaust valves. A well-known technique of effectuating such CDA operation is to provide a lost motion component in a valve train for a given engine valve, which lost motion component is controllable between a first state in which it is capable of transmitting at least some valve actuation motions to the engine valve thereby opening the engine valve, and a second state in which it is capable of absorbing substantially all valve actuation motions applied thereto thereby preventing the engine valve from being opened. Some lost motion components of this type employ a hydraulically controlled locking mechanism disposed between two elements of the lost motion component capable of movement relative to each other. In one embodiment of such hydraulically controlled lost motion components, the absence of pressurized hydraulic fluid (e.g., engine oil as provided by an oil pump) being applied to the locking mechanism as a control input allows the locking mechanism to default to a locked state in which the two elements of the lost motion component are locked together, thereby permitting valve actuation motions to be transferred from a first element to a second element and, ultimately, on to the engine valve. However, further this default locking embodiment, when pressurized hydraulic fluid is applied to the locking mechanism as a control input, the locking mechanism assumes an unlocked state in which the two elements of the lost motion component are unlocked from each other, thereby preventing valve actuation motions applied to the first element from being applied to the second element and effectively absorbing or "losing" the valve actuation motions. As known to those skilled in the art, such hydraulically controlled lost motion components may also be operated in a default unlocked embodiment, in which the lost motion component defaults to an unlocked/motion absorbing state in the absence of applied, pressurized hydraulic fluid and switches to a locked/motion conveying state in the presence of pressurized hydraulic fluid.

While the benefits of decompression and CDA technologies are numerous, such systems are typically deployed independently of each other, i.e., using separate hardware components. This has the undesirable effect of adding to the cost and complexity of an engine. However, it has been recognized that CDA systems could be employed to provide similar benefits as decompression systems. For example, if a given cylinder is permitted during engine shutdown to achieve a low pressure state followed by CDA operation of at least the intake valves during the remaining crankshaft rotations, the cylinder will be effectively decompressed. However, in CDA systems in which the deactivated state is maintained through the provision of pressurized hydraulic fluid to a locking mechanism (thereby maintaining the locking mechanism in its unlocked state), there is a possibility that a decrease in hydraulic fluid pressure during engine shutdown (due to discontinued operation of the oil pump and oil normal oil leakage from the engine's oil circuits) will allow the locking mechanisms to re-lock, thereby permitting normal valve actuations to resume and causing vibration-inducing high cylinder pressures during piston compression strokes.

Therefore, techniques for accomplishing engine shutdown using lost motion components that overcome the above-described deficiencies would be a welcome addition to the art.

SUMMARY

The instant disclosure concerns the control of engine shutdown of an internal combustion engine using one or more lost motion components. In an embodiment, a method is provided for controlling shutdown of an internal combustion engine comprising a plurality of cylinders and, for each of the plurality of cylinders, a hydraulically controlled lost motion component operatively connected to an engine valve corresponding to the cylinder. The method comprises determining, by an engine controller, that shutdown of the internal combustion engine has been requested and, responsive to the request for shutdown, initiating or continuing, by the engine controller, cylinder deactivation operation for each of at least one cylinder of the plurality of cylinders. The initiation or continuation of the cylinder deactivation operation for each of the at least one cylinder comprises, for an input to the hydraulically controlled lost motion component for each of at least one engine valve corresponding to the cylinder, operating the input to provide the cylinder deactivation operation for a duration at least long enough to complete shutdown of the internal combustion engine.

For example, in an embodiment, operating the input to provide the cylinder deactivation operation further comprises trapping hydraulic fluid in the input to the hydraulically controlled lost motion component by isolating the hydraulically controlled lost motion component from a source of hydraulic fluid requiring engine operation for pressurization.

In another embodiment, operating the input to provide the cylinder deactivation operation further comprises pressurizing hydraulic fluid in the input to the hydraulically controlled lost motion component via a pump that operates independently relative to engine operation.

In yet another embodiment, operating the input to provide the cylinder deactivation operation further comprises discontinuing provision of hydraulic fluid to the input of the hydraulically controlled lost motion component.

In an embodiment, the at least one engine valve controlled during cylinder deactivation is an intake valve and, in a further embodiment, may also comprise an exhaust valve.

In an embodiment, the method may further comprise, prior to operating the input to the hydraulically controlled lost motion component for the intake valve to provide the cylinder deactivation operation, operating, by the engine controller, the input to the hydraulically controlled lost motion component for the exhaust valve to perform an exhaust event. This embodiment may further comprise, after operating the input to the hydraulically controlled lost motion component for the intake valve to provide the cylinder deactivation operation, operating, by the engine controller, the input to the hydraulically controlled lost motion component for the exhaust valve to provide cylinder deactivation operation.

A corresponding engine controller is also disclosed.

BRIEF DESCRIPTION OF THE DRAWINGS

The foregoing and other features and advantages will be discussed in detail in the following non-limiting description of specific embodiments in connection with the accompanying drawings, in which.

DETAILED DESCRIPTION OF THE PRESENT EMBODIMENTS

As used herein, phrases substantially similar to "at least one of A, B or C" are intended to be interpreted in the disjunctive, i.e., to require A or B or C or any combination thereof unless stated or implied by context otherwise. Further, phrases substantially similar to "at least one of A, B and C" are intended to be interpreted in the conjunctive, i.e., to require at least one of A, at least one of B and at least one of C unless stated or implied by context otherwise. Further still, the term "substantially" or similar words requiring subjective comparison are intended to mean "within manufacturing tolerances" unless stated or implied by context otherwise.

As used herein, the phrase "operatively connected" refers to at least a functional relationship between two elements and may encompass configurations in which the two elements are directly connected to each other, i.e., without any intervening elements, or indirectly connected to each other, i.e., with intervening elements.

Figure 1:
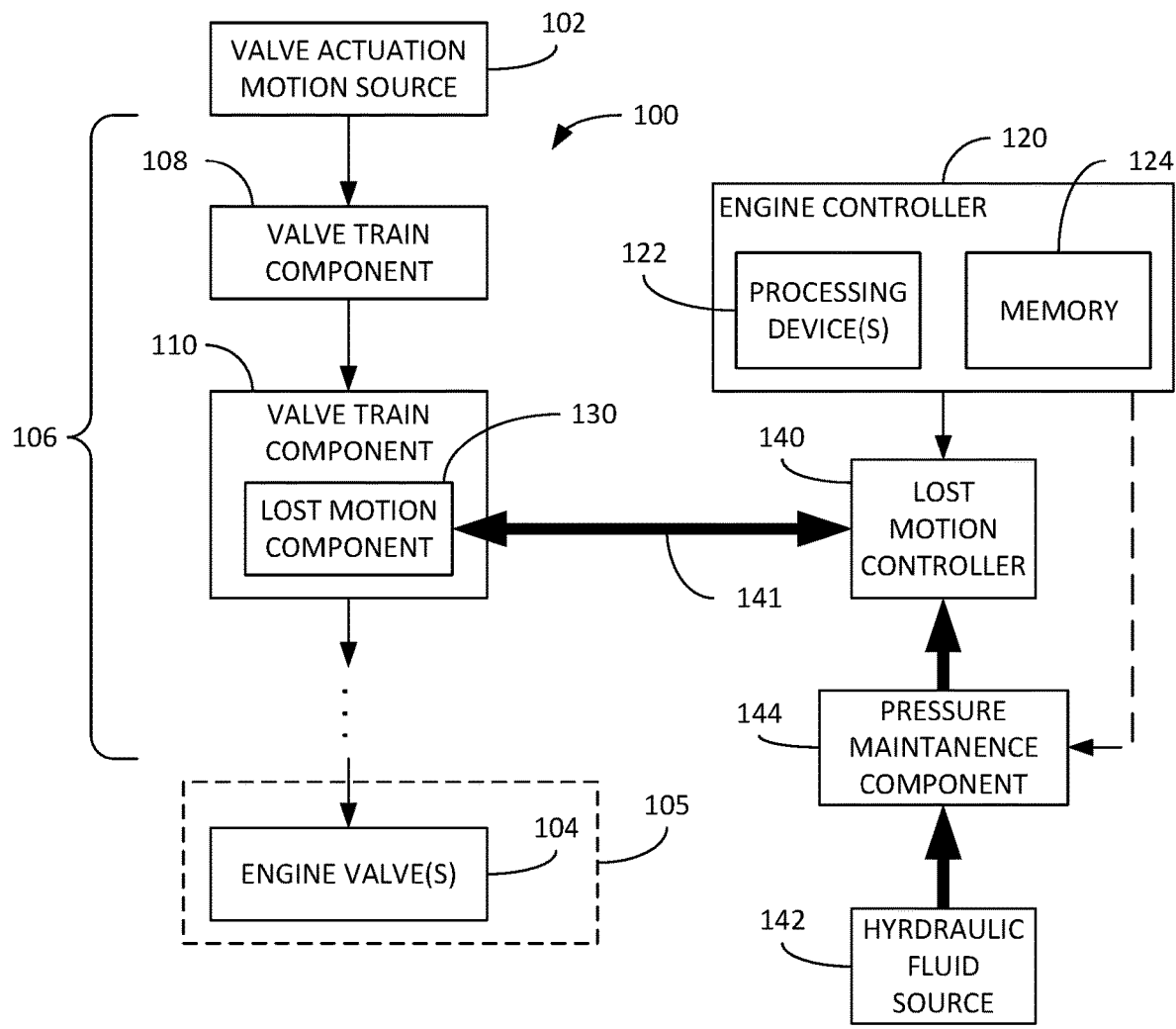
FIG. 1 schematically illustrates a valve actuation systems in accordance with the instant disclosure.

FIG. 1 schematically illustrates an embodiment of a valve actuation system 100 incorporating a lost motion component 130. As shown, the valve actuation system 100 comprises a valve actuation motion source 102 that provides valve actuation motions (i.e., valve opening and closing motions) to one or more engine valves 104 via a valve actuation load path 106. The one or more engine valves 104 are associated with a cylinder 105 of an internal combustion engine. As known in the art, each cylinder 105 typically has at least one valve actuation motion source 102 uniquely corresponding thereto for actuation of the corresponding engine valve(s) 104. Further, although only a single cylinder 105 is illustrated in FIG. 1, it is appreciated that an internal combustion engine may comprise, and often does, more than one cylinder and the valve actuation systems described herein are applicable to any number of cylinders for a given internal combustion engine. Furthermore, the engine valves(s) may comprise intake engine valves and/or exhaust engine valves. Although a single valve train 106 is depicted in FIG. 1, it is understood that multiple such valve trains may be provided for each cylinder 105 in a multi-cylinder engine, with such multiple valve trains being separately provided for one or more intake valves and one or more exhaust valves.

The valve actuation motion source 102 may comprise any combination of known elements capable of providing valve actuation motions, such as one or more cams. In accordance with known techniques, the valve actuation motion source 110 may be dedicated to providing exhaust motions, intake motions, auxiliary motions or a combination of exhaust or intake motions together with auxiliary motions.

As shown, the valve actuation load path 106 may comprise one or more valve train components (in the illustrated example, first and second valve train components 108, 110) deployed between the valve actuation motion source 102 and the at least one engine valve 104 and used to convey motions provided by the valve actuation motion source 102 to the at least one engine valve 104, e.g., tappets, pushrods, rocker arms, valve bridges, automatic lash adjusters, etc. Although two valve train components 108, 110 are illustrated in FIG. 1, it is understood that a greater or lesser number of valve train components may be deployed. Further, in this example, the valve actuation load path 106 includes a lost motion component 130 housed within the second valve train component 110. That is, while the lost motion component 130 may contact other components in the valve train 106, it is fully supported by and maintained within the valve train 106 by virtue of being housed within the second valve train component 110. For example, the second valve train component 110 may be embodied by a rocker arm or valve bridge having a bore formed therein in which constituent components forming the lost motion component 130 are deployed. In an alternative embodiment, the lost motion component 130, rather than being housed within one of the valve train components 108, 110, may instead be housed within a fixed member, such as a cylinder head or engine block, while still contacting the second valve train component 110. For example, in the case where the second valve train component 110 is an end pivot type rocker arm or finger follower, the lost motion component 130 may be embodied by a collapsible pivot as known in the art.

As further depicted in FIG. 1, an engine controller 120 may be provided and operatively connected to the lost motion component 130. Among other things, the engine controller 120 functions to control operation of the lost motion mechanism 130, i.e., switching between its respective locked and unlocked states as described above. For example, the engine controller 120 may be implemented by one or more processing devices 122 and corresponding memory 124 storing executable instructions used to implement the required control functions, including those described below, as known in the art. It is appreciated that other functionally equivalent implementations of the engine controller 120, e.g., a suitable programmed application specific integrated circuit (ASIC) or the like, may be equally employed.

Further, as shown in the example of FIG. 1, the engine controller 120 may control operation of the lost motion component 130 via a lost motion controller 140 intermediate to engine controller 120 and the lost motion device 130. For example, where the lost motion component 130 is a hydraulically controlled mechanism (i.e., responsive to the absence or application of hydraulic fluid to an input), the lost motion controller 140 may comprise a suitable solenoid, as known in the art, for controlling flow of hydraulic fluid (illustrated using heavy arrows) from a hydraulic fluid source 142 to the hydraulically controlled lost motion component 130. For example, the lost motion device 130 may be of the type described and illustrated in FIG. 1 of U.S. Pat. No. 9,790,824, the teachings of which patent are incorporated herein by this reference. As known in the art, the hydraulic fluid source 142 may comprise an oil pump in fluid communication with an oil reservoir, where the oil pump sufficiently pressurizes engine oil for distribution throughout the entire internal combustion engine. In this case, the lost motion controller/solenoid 140 receives electrical signals from the engine controller 120 that control flow of hydraulic fluid from the hydraulic fluid source 142, through one or more hydraulic passages 141, to the lost motion component 130. Additionally, the lost motion controller/solenoid 140 may be of the type that can be controlled by the engine controller 120 to not only discontinue flow of hydraulic fluid from the hydraulic fluid source 142 to the lost motion component 130, but to also vent the hydraulic passages 141, i.e., depressurize an input to the lost motion component 130 thereby allowing the lost motion component 130 to revert to its default state.

As noted above, during engine shutdown, it may be the case that pressurization of hydraulic fluid by the hydraulic fluid source 142 may decrease sufficiently quickly to cause an operational state change in the lost motion component 130, which could prevent use of the lost motion component 130 to avoid the undesirable effects of engine shutdown also noted above. To counteract this, a feature of the instant disclosure is the provision of a pressure maintenance component 144 interposed between the hydraulic fluid source 142 and the lost motion controller 140 as shown in FIG. 1. The pressure maintenance component 144 is provided to maintain pressure in the hydraulic passages 141 and controlling input to the lost motion component 130 during shutdown operation of the internal combustion engine, without regard to the operation the hydraulic fluid source 142 (with the exception noted below). As illustrated, operation of the pressure maintenance component 144 may be controlled by the engine controller 120 (as illustrated by the dashed arrow therebetween) in some embodiments. Alternatively, the pressure maintenance component 144 may comprise a passive component that operates independently of the engine controller. Regardless of the specific implementation, it is noted that cylinder deactivation operation of a given cylinder during engine shutdown is provided by the combination of the lost motion controller 140 and the pressure maintenance component 144, as described in further detail below.

For example, in an embodiment, the pressure maintenance component 144 may comprise an additional solenoid configured, during a first unpowered/default state, to permit fluid flow from the hydraulic fluid source 142 to the lost motion controller 140 and further configured, during a second powered/activated state, to cut off fluid communication between hydraulic fluid source 142 and the lost motion controller 140. In use, the pressure maintenance component 144 would be controlled to operate in its first state during normal engine operation (including CDA operation occurring during periods of operation other than engine shutdown), i.e., the pressure maintenance component 144 would act essentially like a typical hydraulic passage. However, during engine shutdown operation, the pressure maintenance component 144 may be controlled to switch to its second state, thus closing off fluid flow and thereby isolating the hydraulic passages 141 and controlling input to the lost motion component 130 from the engine's pressurized hydraulic fluid source 142. Because pressurized hydraulic fluid is thereby trapped in the hydraulic passages 141 and controlling input to the lost motion component 130, the lost motion component 130 is prevented from changing its operating state for at least a period of time dictated by normal fluid leakages in the hydraulic passages 141 (and the lost motion component 130 itself). Presuming that such period of time is sufficiently long, operation of the lost motion component 130 in its desired state during engine shutdown is ensured despite loss of pressurized hydraulic fluid from the hydraulic fluid source 142.

In another embodiment, the pressure maintenance component 144 may be implemented using a pump that is capable of operation independent from operation of the internal combustion engine. For example, the pressure maintenance component 144 may comprise an electric oil pump (which may be separate from or incorporated into the hydraulic fluid source 142) that may be controlled by the engine controller 120. Thus, despite engine shutdown, the engine controller 120 may nevertheless instruct the electric oil pump to continue operating such that pressure is maintained in the hydraulic passages 141 and controlling input to the lost motion component 130. Once engine shutdown has been successfully completed, the engine controller 120 can then instruct the electric oil pump to discontinue operation, thereby depressurizing the hydraulic passages 141 and controlling input to the lost motion component 130 and allowing the lost motion component 130 to re-assume its default operating state.

In yet another embodiment, the pressure maintenance component 144 may be implemented as a variable displacement pump that is part of the hydraulic fluid source 142 and dependent upon operation of the internal combustion engine. In this case, when shutdown is requested, the engine controller 120 may control the variable displacement pump to operate in an increased output mode, thereby temporarily increasing hydraulic fluid flow and pressure during shutdown operation. Such increase in flow/pressure during shutdown may be sufficient to ensure continued CDA operation during the shutdown process.

As an example of a passive pressuring maintenance component 144 is a check valve that permits one-way flow from the hydraulic fluid source 142 to the lost motion controller 140 under all operating conditions. In this case, similar to above-described solenoid embodiment, the check valve prevents back flow from the hydraulic passages 141 to the hydraulic fluid source 142 regardless of when a shutdown event is initiated, such that isolation of the hydraulic passages 141 is ensured at all times. In the event of engine shutdown, pressure is maintained in the hydraulic passages 141 until such time as normal leakage occurs or the lost motion controller 140 is operated to vent the hydraulic passages 141. Additionally, this implementation provides the advantage of requiring less hardware than the implementation of the above-mentioned actively controlled embodiments.

It is noted that FIG. 1 illustrates a simplified example in which a single lost motion controller 140 and corresponding pressure maintenance component 144 controls hydraulic isolation of one lost motion component 130 for a single valve train 106. However, this is not a requirement. In practice, multiple pressure maintenance components 144 may be provided on a per cylinder or subgroup of cylinders basis, a per valve type (intake or exhaust) basis, or on a per cylinder/subgroup of cylinders and per valve type basis. Thus, for example, a single combination of a lost motion controller 140 and pressure maintenance component 144 may be associated with multiple cylinders to either control a single type of engine valve (intake or exhaust) across the cylinder group or to control both types of cylinders across the cylinder group.

Various examples of such configurations are schematically illustrated with reference to FIGS. 2-6, in which like reference numerals refer to like elements as compared to FIG. 1. Each of FIGS. 2-6 illustrates a plurality of N cylinders (labeled "Cylinder 1" through "Cylinder N") that may be controlled according to varying levels of individual and group schemes.

Figure 2:
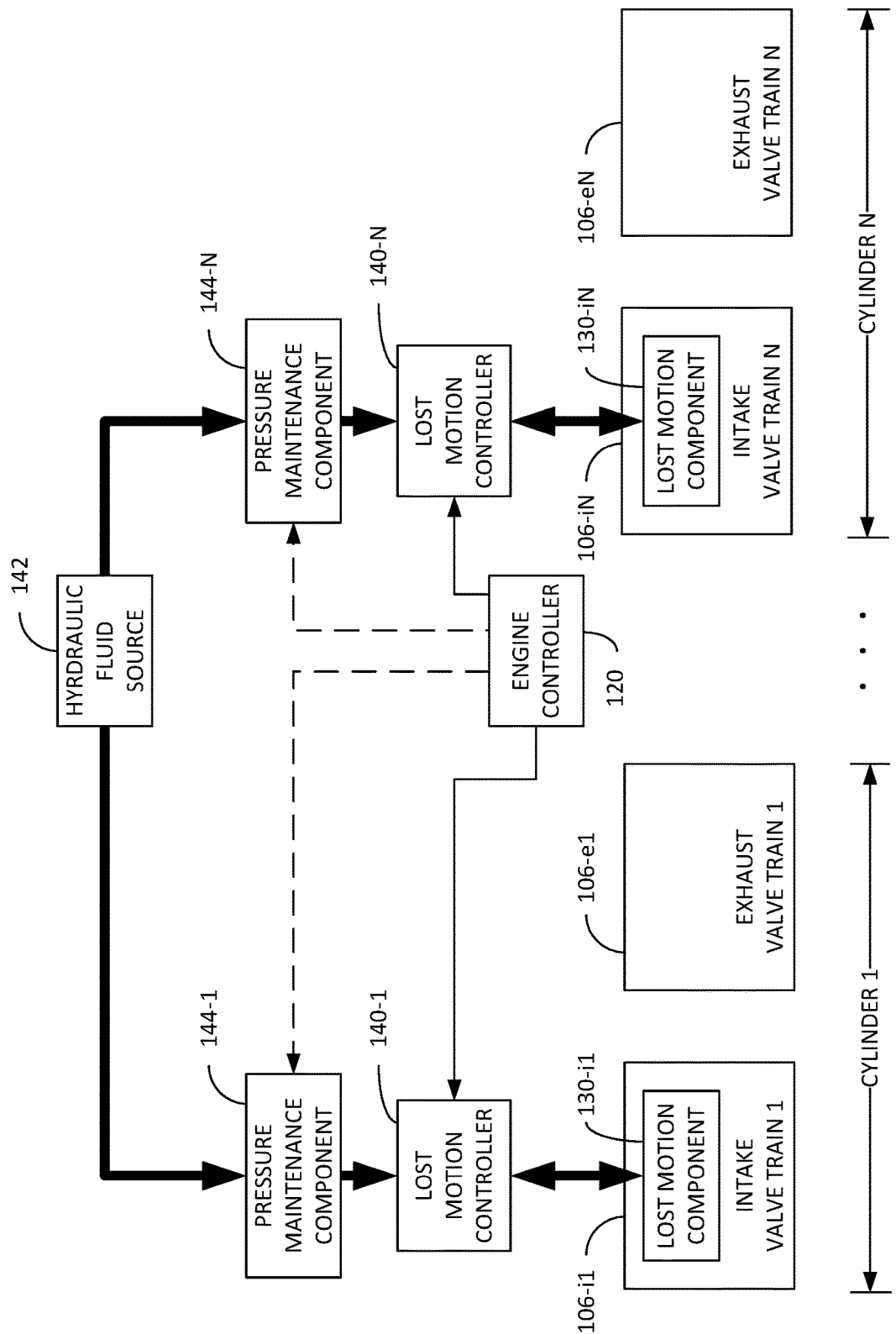
FIGS. 2-7 schematically illustrate various embodiments of an internal combustion engine in accordance with the instant disclosure.

In a first example shown in FIG. 2, cylinder deactivation capability is provided through the use of lost motion components 130-$i$1-130-$i$N in only the intake valve trains 106-$i$1-106-$i$N of each of the N different cylinders. In this embodiment, each lost motion component 130-$i$1-130-$i$N is controlled through its own unique combination of lost motion controller 140-1-140-N and corresponding pressure maintenance component 144-1-144-N. It is noted that the exhaust valve train 106-$e$1-106-$e$N for each cylinder is not provided with a corresponding lost motion component, and therefore do not contribute to shutdown operation as described in further detail below. In this manner, cylinder deactivation operation may be provided on a per cylinder basis through control of only the corresponding intake valve train 106-11-106-iN. In an alternative embodiment, a single lost motion component 140 and pressure maintenance component 144 may be provided to control operation of all N different lost motion components 130-$i$1-130-$i$N, i.e., all lost motion components 130-$i$1-130-$i$N of the N-cylinder subgroup are controlled together.

Figure 3:
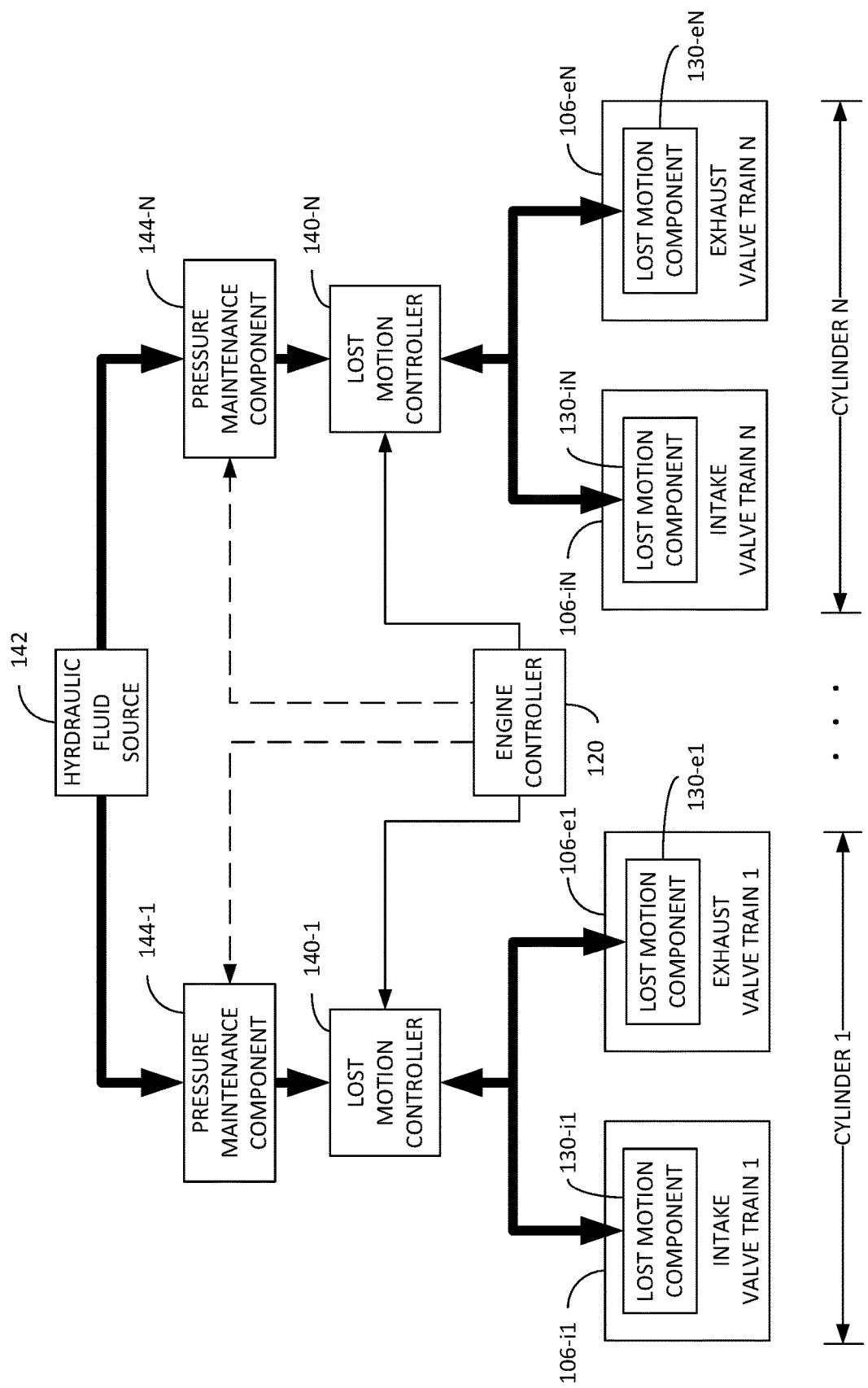

In a second example shown in FIG. 3, a configuration is provided substantially similar to that illustrated in FIG. 2, with the exception that each of the exhaust valve trains 106-$e$1-106-eN is provided with a corresponding lost motion component 130-$ei$-130-eN. In this example, both intake and exhaust lost motion components 130-$i$1-130-$i$N, 130-$e$1-130-$e$N for each cylinder are controlled by single lost motion controller 140-1-140-N for that cylinder. Similarly in this embodiment, a single pressure maintenance component 140-1-140-N is provided for each cylinder. In other words, for each cylinder, both the intake and exhaust lost motion components for that cylinder are controlled by dedicated pressure maintenance and lost motion controller components for both non-shutdown-related CDA operation and shutdown-related CDA operation.

Figure 4:
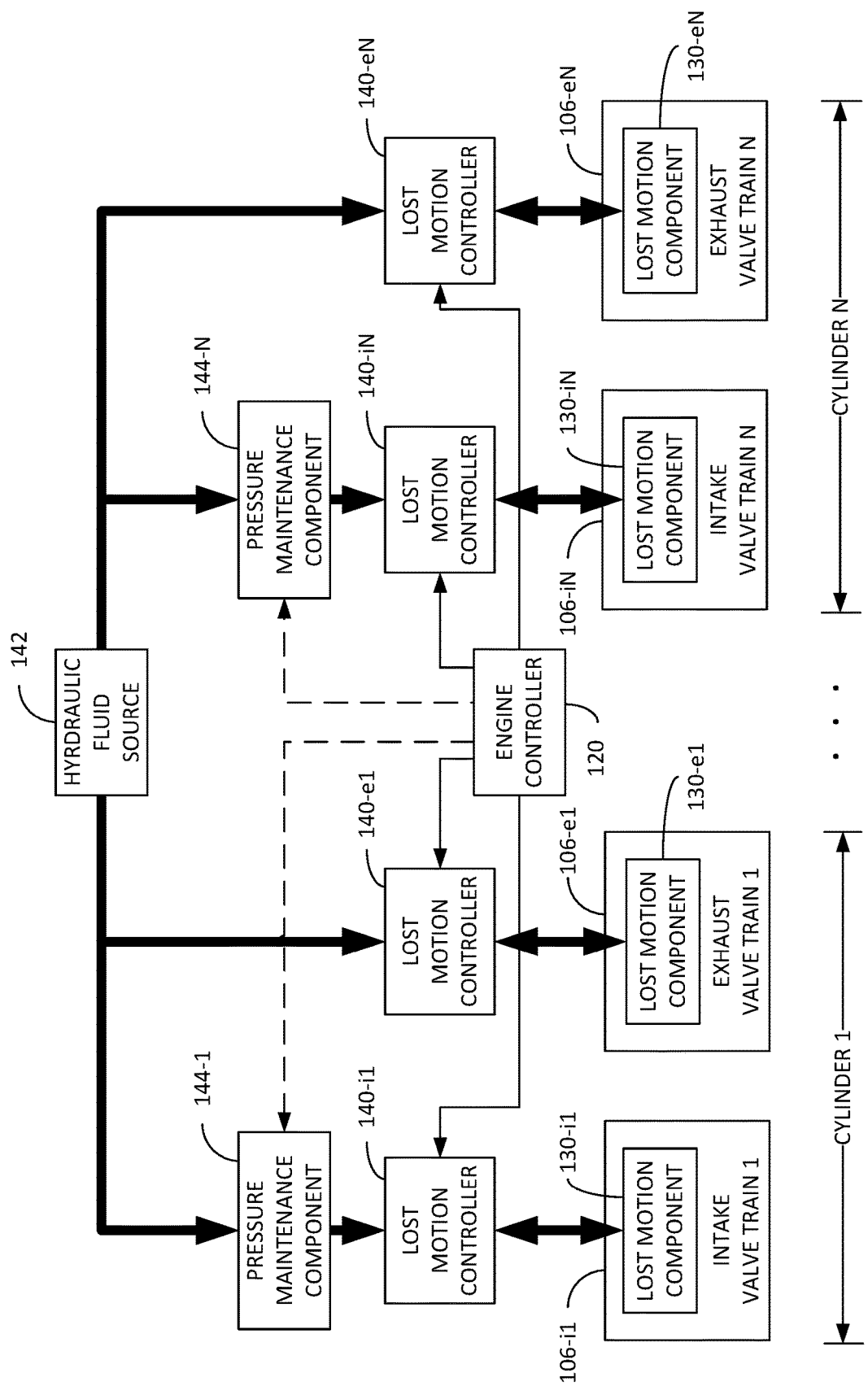

In a third example shown in FIG. 4, a configuration is provided that is also substantially similar to that illustrated in FIG. 2, with the exception that each of the exhaust valve trains 106-$e$1-106-$e$N is provided with a corresponding lost motion component 130-$e$1-130-$e$N that, in turn, is controlled by a corresponding lost motion controller 140-$e$1-140-$e$N. It is noted, however, that a pressure maintenance component is not provided for any of the exhaust valve trains 106-$e$1-106-$e$N. Such an embodiment may be employed in scenarios in which non-shutdown-related CDA operation is to be provided using both intake and exhaust valves, whereas shutdown-related CDA operation is to be provided using only the intake valves.

Figure 5:
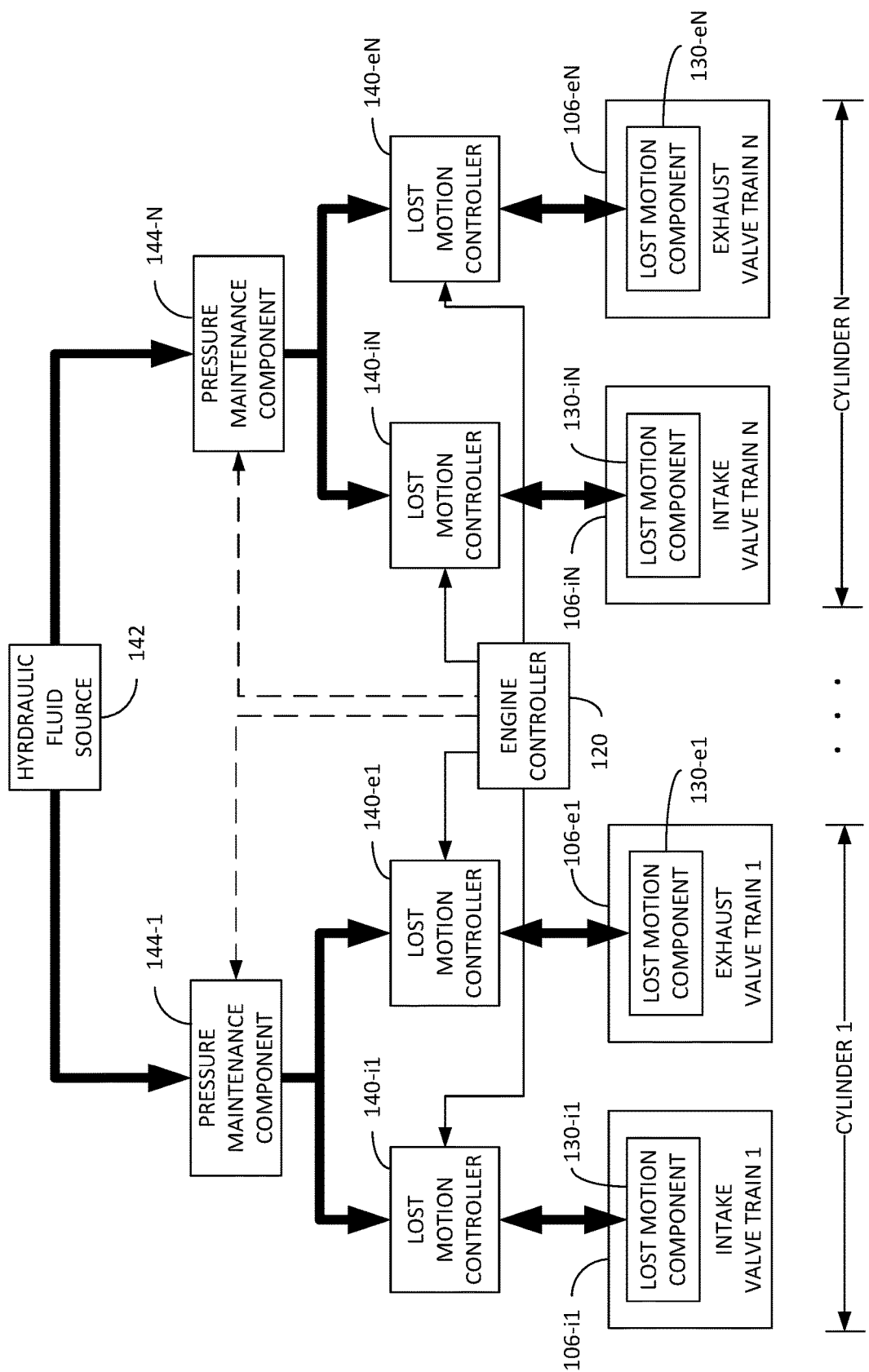

In a fourth example shown in FIG. 5, each of the intake and exhaust valve trains 106-$i$1-106-$i$N, 106-$e$1-106-$e$N is provided with a corresponding lost motion component 130-$i$1-130-$i$N, 130-$e$1-130-$e$N and lost motion controller 140-$i$1-140-$i$N, 140-$el$-140-$e$N. In this manner, non-shutdown-related CDA operation may be provided on a per cylinder and per engine valve type basis. However, in this embodiment, only a single pressure maintenance component 144-1-144-N is provided for each cylinder. As a result, while shutdown-related CDA operation may be provided on a per cylinder basis, control on a per engine valve type basis is not possible. In this manner, hardware complexity for components related specifically to shutdown operation is decreased while still providing per cylinder CDA control.

Figure 6:
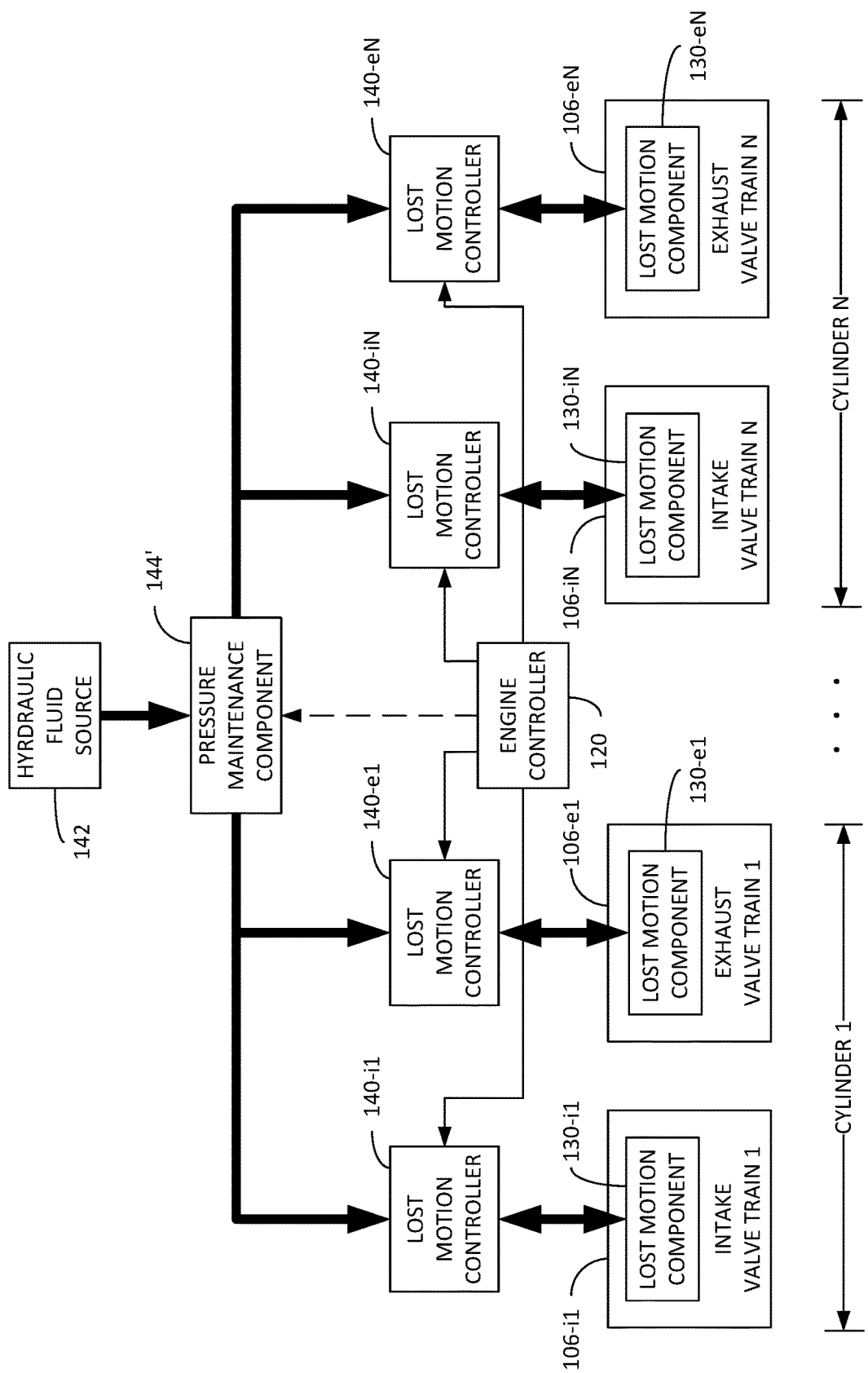

In a fifth example shown in FIG. 6, a configuration is provided substantially similar to that illustrated in FIG. 5, with the exception that a single pressure maintenance component 144' is provided for all N cylinders. In this manner, non-shutdown-related CDA operation may once again be provided on a per cylinder and per engine valve type basis. However, shutdown-related CDA operation may only be provided on a per cylinder group basis (i.e., the group comprising Cylinder 1 through Cylinder N), and control on a per engine valve type basis is once again not possible.

Figure 7:
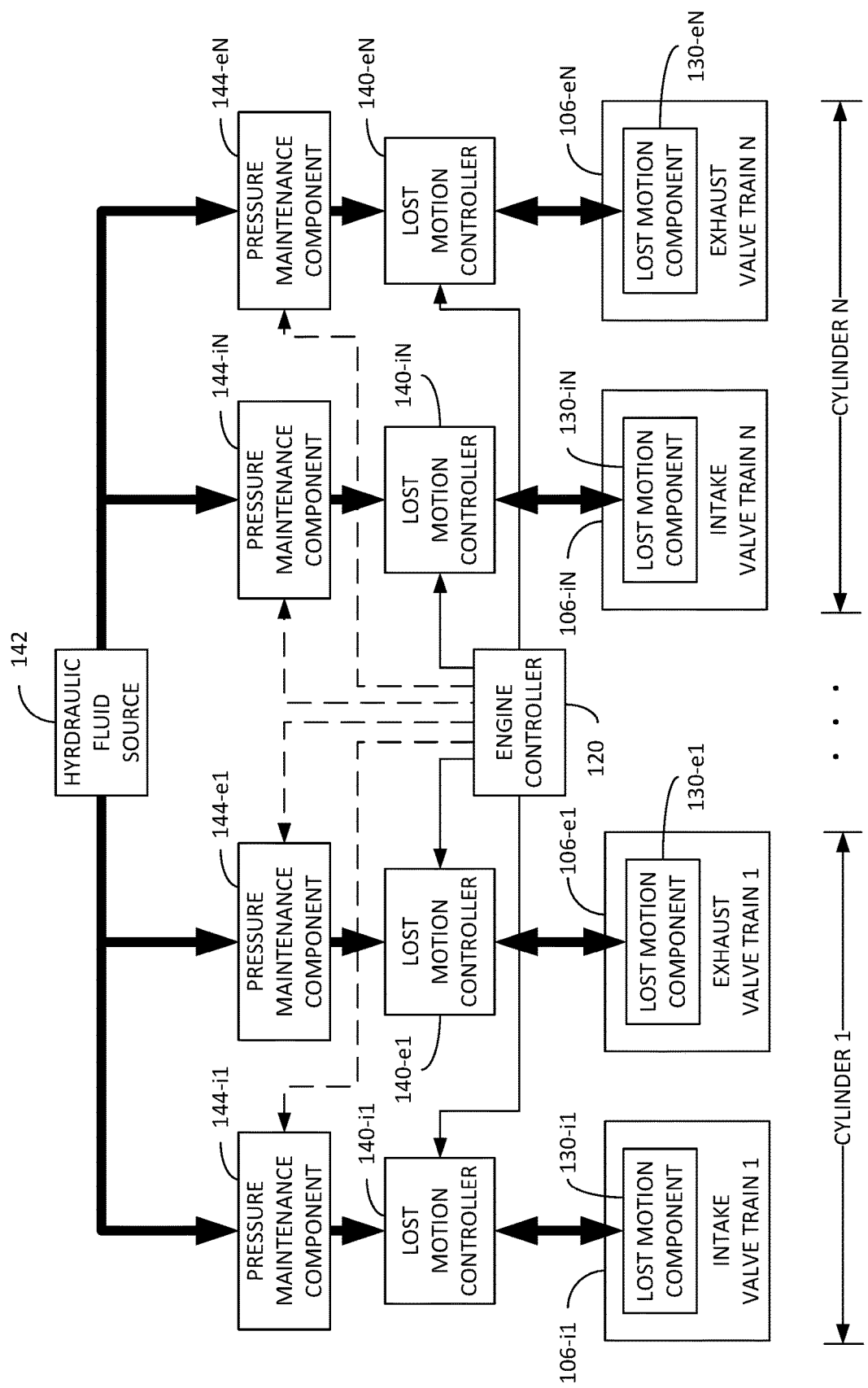

In a sixth example shown in FIG. 7, each cylinder and its corresponding intake and exhaust trains 106-$i$1-106-$i$N, 106-$e$1-106-$e$N is provided with a lost motion component 130-$i$1-130-$i$N, 130-$e$1-130-$e$N, lost motion controller 140-$il$-140-iN, 140-$el$-140-$e$N and pressure maintenance component 140-$i$1-140-iN, 140-$e$1-140-$e$N combination. In this manner, independent control of each valve train -$i$1-106-$i$N, 106-$e$1-106-$e$N may be achieved during both non-shutdown-related and shutdown-related CDA operation.

As will be appreciated by those skilled in the art, further configuration similar to those illustrated in FIGS. 2-7 may be possible depending on the needs for any given internal combustion engine.

Figure 8:
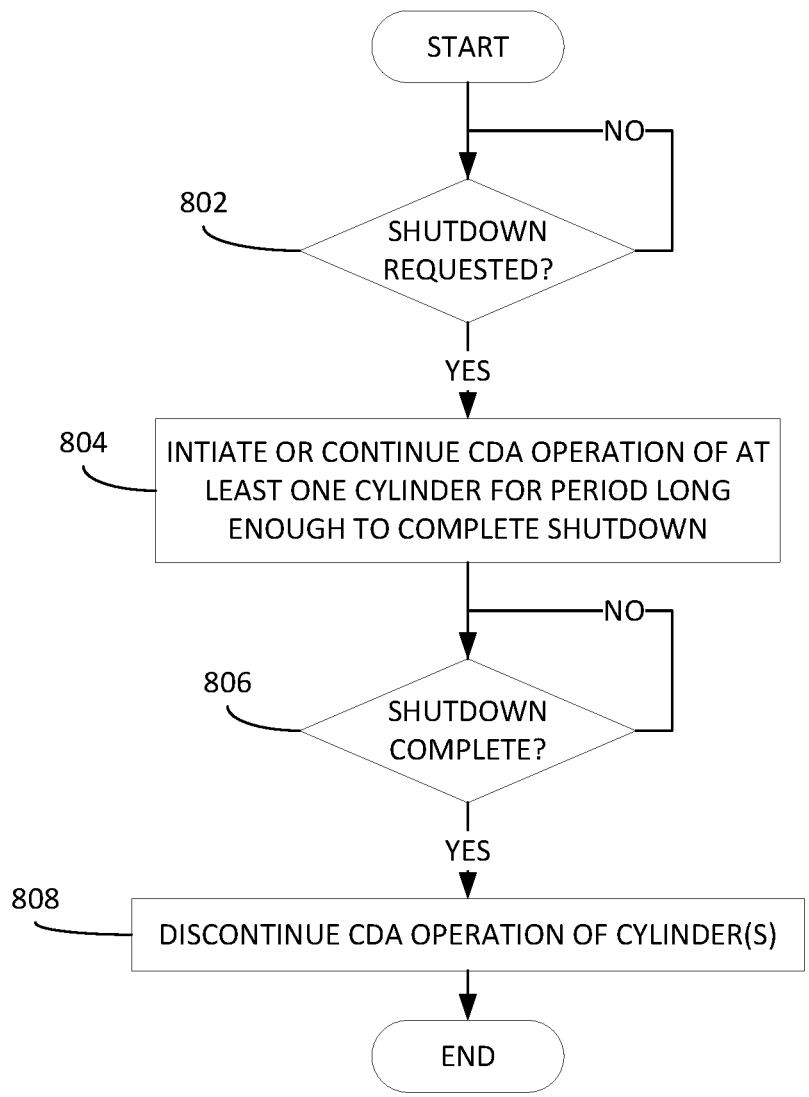
FIG. 8 is a flowchart illustrating processing in accordance with the instant disclosure.

Reference is now made to FIG. 8, which illustrates a flow chart of processing in accordance with the instant disclosure. In an embodiment, the processing illustrated in FIG. 8 is performed by an engine controller, as described above, to implement shutdown-related CDA operation. Thus, beginning at block 802, the engine controller of an internal combustion engine determines that shutdown operation has been requested. As known in the art, shutdown operation may be requested in response to any of a number of conditions, and the instant disclosure is not limited in that regard. Furthermore, techniques for detecting such requests are known to those skilled in the art.

Once occurrence of a shutdown request has been determined, processing continues at block 804 where, responsive to the shutdown request, the engine controller initiates or continues cylinder deactivation operation for at least one cylinder of a plurality of cylinders provided in the internal combustion engine. That is, in the case where a given cylinder has been operating in a normal, positive power producing mode, the request for shutdown may cause the engine controller to switch operation of that cylinder to CDA operation in order to fulfill the shutdown request. Alternatively, if the cylinder has already been operating in CDA mode when the request for shutdown is received, the engine controller permits the cylinder to continue to operate in CDA mode.

For example, with respect to the embodiment above in which the lost motion components and pressure maintenance components for a given cylinder are implemented as solenoids, and the lost motion components for a given cylinder are implemented using default locked lost motion components, the processing of step 804 is performed by the engine controller first activating or energizing one or more lost motion controllers for the cylinder as in the case where the one or more lost motion controllers were not already activated, or continuing to activate the one or more lost motion controllers as in the case where CDA operation for the cylinder was previously enabled prior to occurrence of the shutdown request. Thereafter, in order to ensure continued CDA operation of the desired engine valves for the cylinder, one or more pressure maintenance components/solenoids are activated or energized, thereby isolating the hydraulic passages downstream of the lost motion controller(s) and leading up to controlling inputs of the relevant lost motion components. As a result, hydraulic pressure in the hydraulic passages and lost motion component inputs will stay pressurized for a period of time, thereby maintaining the associated lost motion components in their unlocked/motion absorbing state. Provided that leakage in the hydraulic pathways downstream of the respective pressure maintenance components is sufficiently low, and provided that the pressure maintenance component/solenoid and relevant lost motion controllers/solenoids remain energized at least to the end of the shutdown process, the lost motion components may be maintained in their unlocked state thereby facilitating continued CDA operation of the associated engine valves at least for the duration of the entire shutdown process.

Alternatively, where the pressure maintenance components are implemented by one or more electric oil pumps, the processing described in the previous paragraph proceeds as before. However, rather than activating/energizing a solenoid as the pressure maintenance components, the engine controller activates/energizes the electric oil pump (if not already activated/energized) such that hydraulic fluid pressure in the hydraulic passages leading to the respective lost motion component control inputs is maintained notwithstanding any potential loss of pressure coming from the hydraulic fluid supply that might otherwise occur if an oil pump for the hydraulic fluid supply is of a mechanical type dependent upon continued operation of the internal combustion engine.

In yet another alternative, where the pressure maintenance components are implemented by one or more check valves as described above, the above described processing proceeds as before. However, the need for the engine controller to actively control (i.e., to activate or energize) the pressure maintenance component(s) is eliminated to the extent that the check valves are always operative, thereby ensuring at least temporary pressurization of the hydraulic passages/lost motion component control input subject to leakages and/or venting provided by the relevant lost motion controllers.

The particular implementation used to provide the desired hydraulic isolation of the lost motion components during shutdown may determine how the desired cylinder decompression operation during shutdown is achieved. That is, in addition to ensuring continued CDA operation during engine shutdown, successful implementation of cylinder decompression may require consideration of the timing of specific CDA operation activations during the shutdown process. Those skilled in the art will appreciate that such timing can be effectuated though the activation/deactivation of the relevant lost motion controllers, even on an engine cycle-by-engine cycle basis. Such timing, in turn, may be dictated by the operating state of the engine when a shutdown event is initiated as well as the specific configuration of the isolation circuitry as described above, for example, with reference to FIGS. 2-7.

Figure 9:
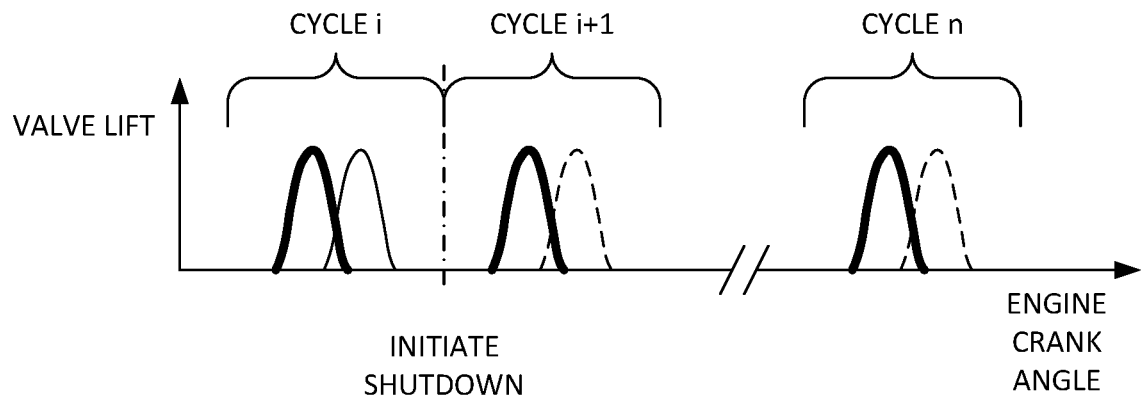
FIGS. 9-11 illustrate valve actuation control schemes for engine shutdown in accordance with the instant disclosure.

More specifically, if a shutdown is initiated while a cylinder is operating in a positive power production mode (e.g., according to normal main intake and exhaust valve lifts) the desired decompression of a cylinder may be achieved by deactivating the relevant intake valves but not the exhaust valves, i.e., continuing to actuate only the exhaust valves. An example of this is illustrated in FIG. 9, which shows a first engine cycle, Cycle i, for a given cylinder in which both exhaust valve events (curves with heavy lines) and intake valve (curves with light lines) occur immediately prior to initiation of engine shutdown. During subsequent engine cycles, Cycles i+1 through Cycle n, at least prior to completed engine shutdown, the intake valve events are deactivated (i.e., lost, as illustrated by the dashed curves) while the exhaust valve motions continue to occur. In this manner, fresh air is prevented from entering the cylinder and continued occurrence of the exhaust valve events ensures cylinder decompression.

Figure 10:
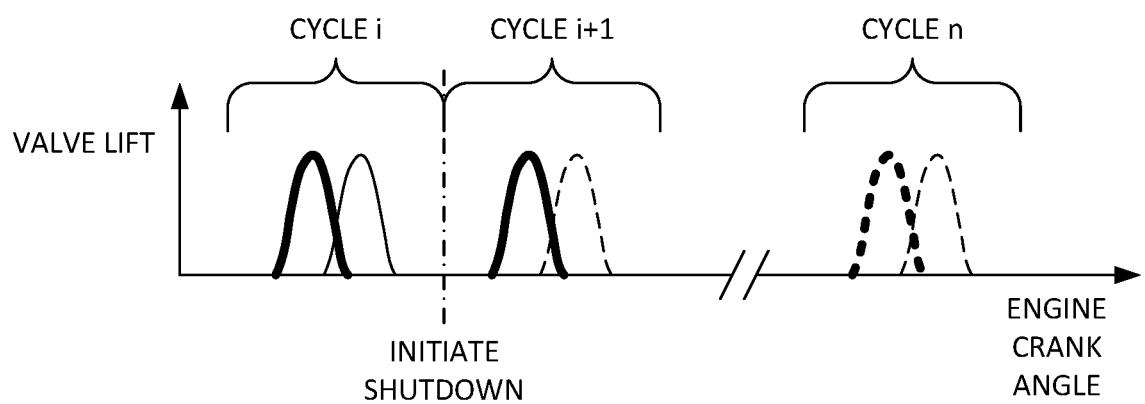

In an alternative embodiment to the scheme illustrated in FIG. 9, rather than only deactivating the intake valve, intake valve events may be deactivated after a successful exhaust valve opening event as shown in Cycle i+1 in FIG. 10. However, following deactivation of the intake valve events, all subsequent exhaust valve events may be likewise deactivated, as shown in Cycle n of FIG. 10. Such timing will establish a so-called low pressure exhaust spring (LPES) in the cylinder, thereby reducing the engine friction during shutdown and providing benefits similar to decompression.

Figure 11:
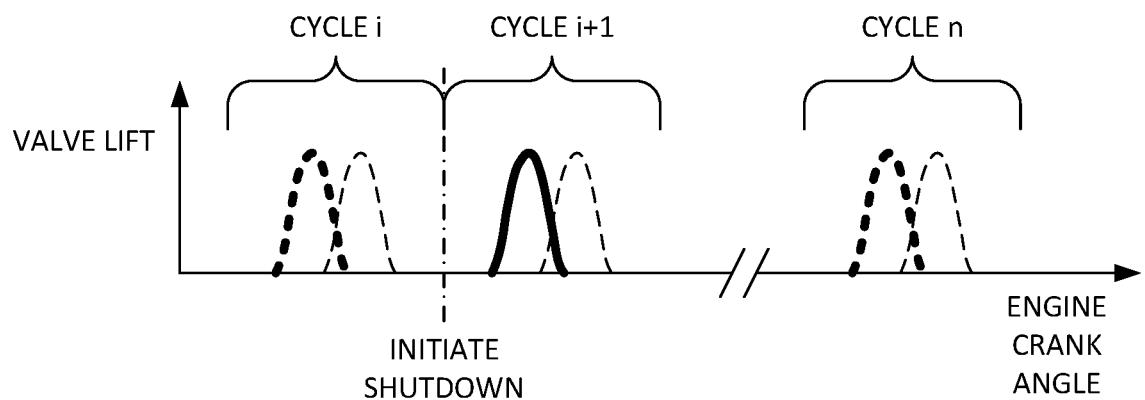

In yet another alternative illustrated in FIG. 11, if shutdown is initiated while a cylinder is already operating in CDA mode (Cycle i), the same alternative described above may be employed, with the exception that deactivation of the exhaust valve is first discontinued (i.e., actuation of the exhaust valve is once again permitted) for at least a single engine cycle, Cycle i+1, while operation of the intake valve in the deactivated state is continued. Thereafter, the exhaust valve may continue to be operated without deactivation, as shown in FIG. 9, thereby ensuring continuing decompression during the shutdown procedure, or may be operated in the deactivated mode (FIG. 11, Cycle n) following the single exhaust event, thereby ensuring operation of the cylinder as an LPES.

As described above, the various schemes illustrated in FIGS. 9-11 may provide the benefit of decompressed cylinders (or LPES cylinders) during shutdown. It is known in the art, however, for valve actuation motion sources in an engine to be equipped with additional lift events to maintain pressure in the cylinders during deactivation and the effect from these added lift events could be eliminated by one or several additional exhaust lift events during the shutdown. For example, any default valve lift (i.e., a valve lift provided by the valve actuation motion source that is applied to the engine valves regardless of the presence of a lost motion component in the corresponding valve train) will re-pressurize the cylinder. Thus, use of the techniques described herein should take into account the nature of the valve actuation motion sources when determining how best to support engine shutdown.

Regardless of how CDA operation during shutdown is implemented, the techniques described herein can reduce costs of engines requiring both decompression at shutdown and CDA by eliminating the need to have specialized hardware for both types of operations.

Referring once again to FIG. 8, processing may continue at block 806, where it is determined by the engine controller whether the requested engine shutdown has been completed. For example, such a determination may be made by measuring speed of the engine, with the shutdown complete determination being made when the speed of the engine falls below a certain threshold or reaches zero.

When it is determined that the requested shutdown has been completed, processing may continue at block 808 where the engine controller discontinues CDA operation of the one or more cylinders (or a subset thereof) previously controlled to operate in CDA mode. For example, this may be achieved by the engine controller controlling the lost motion controllers to vent the hydraulic passages leading up to the control inputs of the relevant lost motion components. In a passive embodiment, this may also be achieved by simply waiting for normal leakages within the hydraulic passages and/or the lost motion component itself to occur, thereby depressurizing the control inputs to such lost motion components. However, as will be appreciated by those skilled in the art, when an engine is shut down as described herein using hydraulic lost motion components of the type described above, cylinders that were deactivated and have valve train motions/cam lift events that are in mid-lift upon completion of the shutdown condition will stay this way until the first engine rotation during a subsequent startup.

While the various embodiments in accordance with the instant disclosure have been described in conjunction with specific implementations thereof, it is evident that many alternatives, modifications and variations will be apparent to those skilled in the art. For example, where a pressure maintenance component is provided by a solenoid, an accumulator in the hydraulic fluid supply system (either upstream or downstream of the pressure maintenance component/solenoid) could be used to maintain oil pressure in those hydraulic passages leading up to the control input of the relevant lost motion components. In the case of a check valve used to provide the pressure maintenance component, as described above, the accumulator is preferably deployed downstream of the check valve.

In another example, air actuation may be used to supplement a shutdown or startup event; more particularly, to use air pressure to actuate the relevant lost motion components to deactivate the engine valves. In many heavy duty vehicles, particularly, pressurized air is always available, even when the engine is not running. As a result, all desired lost motion components could be actuated throughout the entirety of an engine shutdown event. Air pressure could also be used before an engine startup to ensure that all lost motion components are deactivated, as in the case where the lost motion components for one or more of the cylinders are already in an unlocked/motion absorbing state, and the application of the air pressure could be applied to make sure such lost motion components stay unlocked when the engine starts its rotations. In this implementation, the CDA system could be solely operated with air, or air could be added to the existing oil circuit, i.e., the air would supplement the hydraulic fluid system to keep the lost motion components in the unlocked state. Such an implementation would require a check valve at the output of the pressurized air source to prevent hydraulic fluid from entering into the pressurized air source, and also another check valve that is located before (upstream) of the lost motion controller/solenoid in order to prevent air from entering the rest of the engine's lubrication system. In another implementation, air pressure could be applied to a piston in fluid communication with the relevant hydraulic passages such that the air pressure increases pressurization within the hydraulic passages without mixing therein.

In yet another example, the operation of the lost motion component could be reversed so that they are normally in an unlocked/motion absorbing state in the absence of oil pressure (or air, or energy). Therefore, when there is no hydraulic fluid pressure at startup, the engine would default to CDA mode for fast engine rotation. Then, during startup, the lost motion controller/solenoids would be normally open and when hydraulic pressure is achieved, the lost motion controllers would automatically cause the lost motion components to switch to the locked/motion conveying state. That is, the lost motion controllers/solenoids would be energized during the startup to prevent hydraulic fluid pressure from reaching the lost motion components until full valve motion and combustion was desired. This would also be true for a shutdown operation or whenever CDA operation is desired. Then, the lost motion controllers/solenoids would be activated to stop supplying hydraulic fluid to the lost motion components and venting the relevant hydraulic passages, thereby causing the lost motion components to once again default to the unlocked/motion absorbing state. Therefore, for a shutdown event, the lost motion controllers/solenoids would be activated at shutdown speeds, or the lost motion components would automatically unlock when oil pressure drops. But to properly sequence the intake and exhaust valves as described above, and minimize the time for the engine to free-spin, it would be desirable in this case to control when the CDA operation is activated using the lost motion controllers/solenoids.

Accordingly, the preferred embodiments of the invention as set forth herein are intended to be illustrative only and not limiting so long as the variations thereof come within the scope of the appended claims and their equivalents.

What is claimed is:

1. A method for controlling shutdown of an internal combustion engine comprising a plurality of cylinders and, for each of the plurality of cylinders, a hydraulically controlled lost motion component operatively connected to an engine valve corresponding to the cylinder, the method comprising:

determining, by an engine controller, that shutdown of the internal combustion engine has been requested;

responsive to the request for shutdown, initiating or continuing, by the engine controller, cylinder deactivation operation for each of at least one cylinder of the plurality of cylinders; and upon completion of shutdown of the internal combustion engine, discontinuing cylinder deactivation operation for one or more of the at least one cylinder of the plurality of cylinders, wherein initiating or continuing the cylinder deactivation operation for each of the at least one cylinder comprises, for an input to the hydraulically controlled lost motion component for each of at least one engine valve corresponding to the cylinder, operating the input to provide the cylinder deactivation operation for a duration at least long enough to complete shutdown of the internal combustion engine.

2. The method of claim 1, wherein operating the input to provide the cylinder deactivation operation further comprises trapping hydraulic fluid in the input to the hydraulically controlled lost motion component by isolating the hydraulically controlled lost motion component from a source of hydraulic fluid requiring engine operation for pressurization.

3. The method of claim 1, wherein operating the input to provide the cylinder deactivation operation further comprises pressurizing hydraulic fluid in the input to the hydraulically controlled lost motion component via a pump that operates independently relative to engine operation.

4. The method of claim 1, wherein operating the input to provide the cylinder deactivation operation further comprises pressurizing hydraulic fluid in the input to the hydraulically controlled lost motion component via a variable displacement pump that operates dependently relative to engine operation.

5. The method of claim 1, wherein operating the input to provide the cylinder deactivation operation further comprises discontinuing provision of hydraulic fluid to the input of the hydraulically controlled lost motion component.

6. The method of claim 1, wherein the at least one engine valve comprises an intake valve.

7. The method of claim 6, wherein the at least one engine valve additionally comprises an exhaust valve.

8. The method of claim 7, further comprising:
prior to operating the input to the hydraulically controlled lost motion component for the intake valve to provide the cylinder deactivation operation, operating, by the engine controller, the input to the hydraulically controlled lost motion component for the exhaust valve to perform an exhaust event.

9. The method of claim 8, further comprising:
after operating the input to the hydraulically controlled lost motion component for the intake valve to provide the cylinder deactivation operation, operating, by the engine controller, the input to the hydraulically controlled lost motion component for the exhaust valve to provide cylinder deactivation operation.

10. An engine controller operatively connected to an internal combustion engine comprising a plurality of cylinders and, for each of the plurality of cylinders, a hydraulically controlled lost motion component operatively connected to an engine valve corresponding to the cylinder, the controller comprising:
at least one processing device; and
memory having stored thereon executable instructions that, when executed by the at least one processing device cause the at least one processing device to:
determine that shutdown of the internal combustion engine has been requested;
responsive to the request for shutdown, initiate or continue cylinder deactivation operation for each of at least one cylinder of the plurality of cylinders; and
upon completion of shutdown of the internal combustion engine, discontinuing cylinder deactivation operation for one or more of the at least one cylinder of the plurality of cylinders,
wherein those executable instructions that cause the at least one processing device to initiate or continue the cylinder deactivation operation for each of the at least one cylinder are further operative to, for an input to the hydraulically controlled lost motion component for each of at least one engine valve corresponding to the cylinder, operate the input to provide the cylinder deactivation operation for a duration at least long enough to complete shutdown of the internal combustion engine.

11. The engine controller of claim 10, wherein those executable instructions that cause the at least one processing device to operate the input to provide the cylinder deactivation operation are further operative to trap hydraulic fluid in the input to the hydraulically controlled lost motion component by isolating the hydraulically controlled lost motion component from a source of hydraulic fluid requiring engine operation for pressurization.

12. The engine controller of claim 10, wherein those executable instructions that cause the at least one processing device to operate the input to provide the cylinder deactivation operation are further operative to pressurize hydraulic fluid in the input to the hydraulically controlled lost motion component via a pump that operates independently relative to engine operation.

13. The engine controller of claim 10, wherein those executable instructions that cause the at least one processing device to operate the input to provide the cylinder deactivation operation are further operative to pressurize hydraulic fluid in the input to the hydraulically controlled lost motion component via a variable displacement pump that operates dependently relative to engine operation.

14. The engine controller of claim 10, wherein those executable instructions that cause the at least one processing device to operate the input to provide the cylinder deactivation operation are further operative to discontinue provision of hydraulic fluid to the input of the hydraulically controlled lost motion component.

15. The engine controller of claim 10, wherein the at least one engine valve comprises an intake valve.

16. The engine controller of claim 15, wherein the at least one engine valve additionally comprises an exhaust valve.

17. The engine controller of claim 16, wherein the memory further comprises executable instructions that, when executed by the at least one processor cause the at least one processor to:
prior to operating the input to the hydraulically controlled lost motion component for the intake valve to provide the cylinder deactivation operation, operate the input to the hydraulically controlled lost motion component for the exhaust valve to perform an exhaust event.

18. The engine controller of claim 17, wherein the memory further comprises executable instructions that, when executed by the at least one processor cause the at least one processor to:
after operating the input to the hydraulically controlled lost motion component for the intake valve to provide the cylinder deactivation operation, operate the input to the hydraulically controlled lost motion component for the exhaust valve to provide cylinder deactivation operation.

* * * * *